(12) United States Patent
Jia et al.

(10) Patent No.: US 10,877,641 B2
(45) Date of Patent: Dec. 29, 2020

(54) IMAGE ADJUSTMENT METHOD, APPARATUS, DEVICE AND COMPUTER READABLE STORAGE MEDIUM

(71) Applicant: BOE Technology Group Co., Ltd., Beijing (CN)

(72) Inventors: Honghong Jia, Beijing (CN); Dandan Feng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/523,211

(22) Filed: Jul. 26, 2019

(65) Prior Publication Data
US 2020/0126517 A1    Apr. 23, 2020

(30) Foreign Application Priority Data
Oct. 18, 2018   (CN) .......................... 2018 1 1213301

(51) Int. Cl.
G06F 3/0484    (2013.01)
G09G 5/377    (2006.01)
H04N 21/234    (2011.01)
H04N 21/472    (2011.01)
G06T 19/00    (2011.01)
G06N 20/00    (2019.01)

(52) U.S. Cl.
CPC ............ *G06F 3/0484* (2013.01); *G06T 19/00* (2013.01); *G09G 5/377* (2013.01); *H04N 21/23412* (2013.01); *H04N 21/47205* (2013.01); *G06N 20/00* (2019.01); *G09G 2340/12* (2013.01); *G09G 2354/00* (2013.01)

(58) Field of Classification Search
None
See application file for complete search history.

(56) References Cited

U.S. PATENT DOCUMENTS 9,838,674 B2    12/2017   Cho et al.
2009/0022396 A1*  1/2009   Watanabe ............... G06T 5/001
                                              382/167
(Continued)

FOREIGN PATENT DOCUMENTS

CN    101383140 A    3/2009
CN    103873844 A    6/2014
(Continued)

OTHER PUBLICATIONS

Office Action, including Search Report, for Chinese Patent Application No. 201811213301.7, dated Sep. 23, 2019, 14 pages.

*Primary Examiner* — Jwalant Amin
(74) *Attorney, Agent, or Firm* — Westman, Champlin & Koehler, P.A.

(57) ABSTRACT

The present disclosure proposes an image adjustment method, including: determining a distance between a user and a display apparatus; determining, according to a relationship between the distance and a foreground image or a background image displayed on the display apparatus, a target image to which action information of the user is directed, wherein the target image comprises at least one of the foreground image and the background image; determining an adjustment manner corresponding to the action information of the user; and adjusting the target image according to the adjustment manner.

11 Claims, 6 Drawing Sheets

(56) References Cited

U.S. PATENT DOCUMENTS

| | | | |
|---|---|---|---|
| 2009/0164896 A1* | 6/2009 | Thorn | G06F 1/1626 |
| | | | 715/700 |
| 2014/0168390 A1 | 6/2014 | Cho et al. | |
| 2017/0053158 A1* | 2/2017 | Kim | G06F 3/0304 |
| 2017/0200283 A1* | 7/2017 | Yamaguchi | H04N 5/23245 |
| 2018/0115797 A1* | 4/2018 | Wexler | H04L 51/32 |
| 2019/0244411 A1 | 8/2019 | Wang et al. | |
| 2019/0271940 A1* | 9/2019 | Eom | G06F 3/017 |
| 2019/0392640 A1* | 12/2019 | Qian | G06K 9/00671 |

FOREIGN PATENT DOCUMENTS

| | | |
|---|---|---|
| CN | 104408747 A | 3/2015 |
| CN | 107404601 A | 11/2017 |
| CN | 107509043 A | 12/2017 |
| CN | 108307186 A | 7/2018 |

\* cited by examiner

IMAGE ADJUSTMENT METHOD, APPARATUS, DEVICE AND COMPUTER READABLE STORAGE MEDIUM

CROSS-REFERENCE TO RELATED APPLICATION(S)

This application claims priority to the Chinese Patent Application No. CN201811213301.7, filed on Oct. 18, 2018, which is incorporated herein by reference in its entirety.

TECHNICAL FIELD

The present disclosure relates to the field of display technologies, and more particularly, to an image adjustment method, an image adjustment apparatus, an image adjustment device, and a computer readable storage medium.

BACKGROUND

Current electronic devices having a display apparatus mainly comprise both mobile devices and non-mobile devices. In general, it needs to adjust an image displayed on a mobile device through a touch operation, and adjust an image displayed on a non-mobile device through a mouse or a remote controller.

Here, for the manner in which the adjustment is performed through the touch operation, a user is required to be close to a display apparatus, and for the manner in which the adjustment is performed through the mouse or the remote controller, it may achieve a lower adjustment efficiency than the manner in which the adjustment is performed through the touch operation.

SUMMARY

According to a first aspect of the embodiments of the present disclosure, there is provided an image adjustment method, comprising:

determining a distance between a user and a display apparatus;

determining, according to a relationship between the distance and a foreground image or a background image displayed on the display apparatus, a target image to which action information of the user is directed, wherein the target image comprises at least one of the foreground image and the background image;

determining an adjustment manner corresponding to the action information of the user; and adjusting the target image according to the adjustment manner.

In an embodiment, the method further comprises:

acquiring a second image in a case of displaying a first image before determining the distance between the user and the display apparatus; and displaying, on the display apparatus, the first image as the background image and the second image as the foreground image.

In an embodiment, acquiring a second image comprises:

capturing a third image; and extracting a preset type of object from the third image as the second image.

In an embodiment, the method further comprises:

if the target image comprises one of the foreground image and the background image, fusing the adjusted one of the foreground image and the background image with the other one of the foreground image and the background image; and if the target image comprises both the foreground image and the background image, fusing the adjusted foreground image with the adjusted background image.

In an embodiment, a correspondence relationship between the action information and the adjustment manner is predetermined by:

constructing a training set composed of action information and adjustment manners; and performing training through deep learning based on the training set to determine the correspondence relationship between the action information and the adjustment manner.

According to a second aspect of the embodiments of the present disclosure, there is provided an image adjustment device, comprising:

a processor; and a memory coupled to the processor and having instructions stored thereon and executable by the processor;

wherein the instructions, when executed by the processor, cause the processor to be configured to:

determine a distance between a user and a display apparatus;

determine, according to a relationship between the distance and a foreground image or a background image displayed on the display apparatus, a target image to which action information of the user is directed, wherein the target image comprises at least one of the foreground image and the background image;

determine an adjustment manner corresponding to the action information of the user; and adjust the target image according to the adjustment manner.

In an embodiment, the processor is further configured to:

acquire a second image in a case of displaying a first image; and display, on the display apparatus, the first image as the background image and the second image as the foreground image.

In an embodiment, the processor is further configured to:

capture a third image; and extract a preset type of object from the third image as the second image.

In an embodiment, the processor is further configured to:

if the target image comprises one of the foreground image and the background image, fuse the adjusted one of the foreground image and the background image with the other one of the foreground image and the background image; and if the target image comprises both the foreground image and the background image, fuse the adjusted foreground image with the adjusted background image.

In an embodiment, the processor is further configured to:

construct a training set composed of action information and adjustment manners; and perform training through deep learning based on the training set to determine the correspondence relationship between the action information and the adjustment manner.

According to a third aspect of the embodiments of the present disclosure, there is provided a computer readable storage medium having stored thereon a computer program which, when executed by a processor, implements the steps of the method according to any of the embodiments described above.

It should be understood that the above general description and the following detailed description are intended to be illustrative and not restrictive, and cannot be used to limit the present disclosure.

BRIEF DESCRIPTION OF THE DRAWINGS

The accompanying drawings, which are incorporated in the specification and constitute a part of the specification, illustrate the embodiments of the present disclosure, and are used to explain the principle of the present disclosure together with the specification.

DETAILED DESCRIPTION

Exemplary embodiments will be described in detail here, and examples of the embodiments are illustrated in the accompanying drawings. When the following description refers to the accompanying drawings, the same reference signs in different accompanying drawings represent the same or similar elements, unless otherwise indicated. Implementations described in the following exemplary embodiments do not represent all implementations according to the present disclosure. Instead, they are merely examples of apparatuses and methods according to some aspects of the present disclosure which are described in detail in the appended claims.

It may be known from the embodiments described above that, in a case where a display apparatus is at a certain distance from a user, a target image corresponding to action information of the user may be determined according to the distance between the user and the display apparatus, and the target image on the display apparatus may be adjusted by performing an action by the user. Thereby, on the one hand, the user may select the target image and adjust the target image without being close to the display apparatus, and on the other hand, the adjustment is performed by determining an adjustment manner based on the action, which achieves a higher efficiency than the manner in which the adjustment is performed through the mouse or the remote controller.

Figure 1:
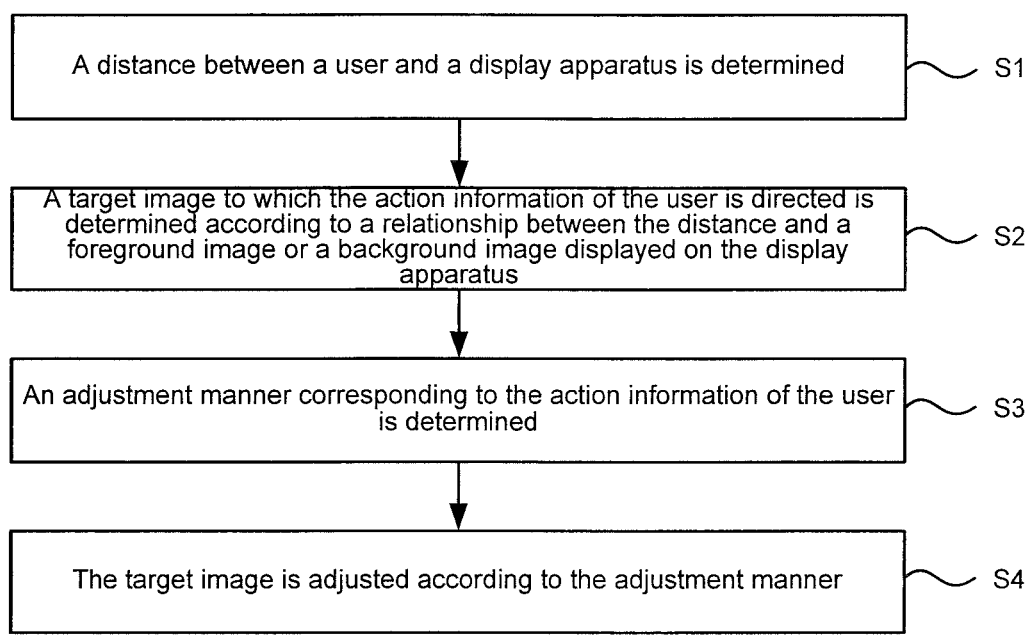
FIG. 1 is a schematic flowchart of an image adjustment method according to an embodiment of the present disclosure.

FIG. 1 is a schematic flowchart of an image adjustment method according to an embodiment of the present disclosure. The image adjustment method according to the present embodiment may be applied to a display apparatus. The display apparatus according to the present embodiment may be any product or component having a display function, such as an electronic paper, a mobile phone, a tablet computer, a television, a notebook computer, a digital photo frame, a navigator, etc.

As shown in FIG. 1, the image adjustment method may comprise the following steps.

In step S1, a distance between a user and a display apparatus is determined.

In an embodiment, the manner in which the distance between the user and the display apparatus is determined may be set as needed. For example, an infrared transceiving apparatus may be disposed on the display apparatus, and the infrared transceiving apparatus may be used to perform infrared ranging to measure the distance between the user and the display apparatus. For example, a depth camera may be disposed on the display apparatus, and the depth camera may be used to acquire a depth image, so that the distance between the user and the display apparatus may be determined based on depth information of the user in the depth image.

It should be illustrated that determining the distance between the user and the display apparatus may refer to determining a distance between the entire body of the user and the display apparatus, or may refer to determining a distance between a certain part of the user and the display apparatus, for example, a distance between a hand of the user and the display apparatus.

In step S2, a target image to which the action information of the user is directed is determined according to a relationship between the distance and a foreground image or a background image displayed on the display apparatus. In an example, the target image comprises at least one of the foreground image and the background image.

In an embodiment, an image(s) displayed on the display apparatus may comprise a foreground image and a background image, wherein the foreground image and the background image may be from one image, or may be obtained by superimposing two or more images. For example, if an image is superimposed on an image which is originally displayed on the display apparatus, the originally displayed image is the background image, and the image which is superimposed on the originally displayed image is the foreground image.

If distances between the user and the display apparatus are different, target images (for example, at least one of the foreground image and the background image) to which action information of the users is directed are also different. For example, it may be set that the larger the distance between the user and the display apparatus is, the higher the layer of the target image to which the action information of the user is directed. In an example, when the distance between the user and the display apparatus is D1, the action information of the user is directed to the foreground image, and when the distance between the user and the display apparatus is D2, the action information of the user is directed to the background image, wherein D1 is greater than D2.

Of course, it may also be set that the larger the distance between the user and the display apparatus is, the lower the layer of the target image to which the action information of the user is directed.

It should be illustrated that each of the foreground image and the background image may comprise multiple layers of images. By taking the foreground image comprising multiple layers of images as an example, a plurality of images may be superimposed on an image which is originally displayed on the display apparatus, wherein the plurality of images which are superimposed may be divided into multiple layers of images according to the time when they are superimposed, for example, the earlier image is superimposed, the lower the corresponding layer is.

In step S3, an adjustment manner corresponding to the action information of the user is determined.

In an embodiment, different action information of the user may correspond to different adjustment manners, wherein the action information of the user may refer to action information of the entire body of the user, such as action information of limbs of the user, or may refer to action information of a certain part of the user, such as action information of a hand of the user.

A correspondence relationship between the action information and the adjustment manner may be predetermined. For example, the correspondence relationship may be predetermined by performing training based on deep learning, or may be predetermined by directly inputting a correspondence relationship between standard gestures and adjustment manners manually.

In step S4, the target image is adjusted according to the adjustment manner.

According to the embodiment of the present disclosure, in a case where a display apparatus is at a certain distance from a user, a target image corresponding to action information of the user may be determined according to the distance between the user and the display apparatus, and the target image on the display apparatus may be adjusted by performing an action by the user. Thereby, on the one hand, it avoids the problem that the user may select the target image and adjust the target image only if the user is close to the display apparatus, and on the other hand, the image is adjusted by determining an adjustment manner based on the action, which achieves a higher efficiency than the manner in which the adjustment is performed through the mouse or the remote controller.

Figure 2:
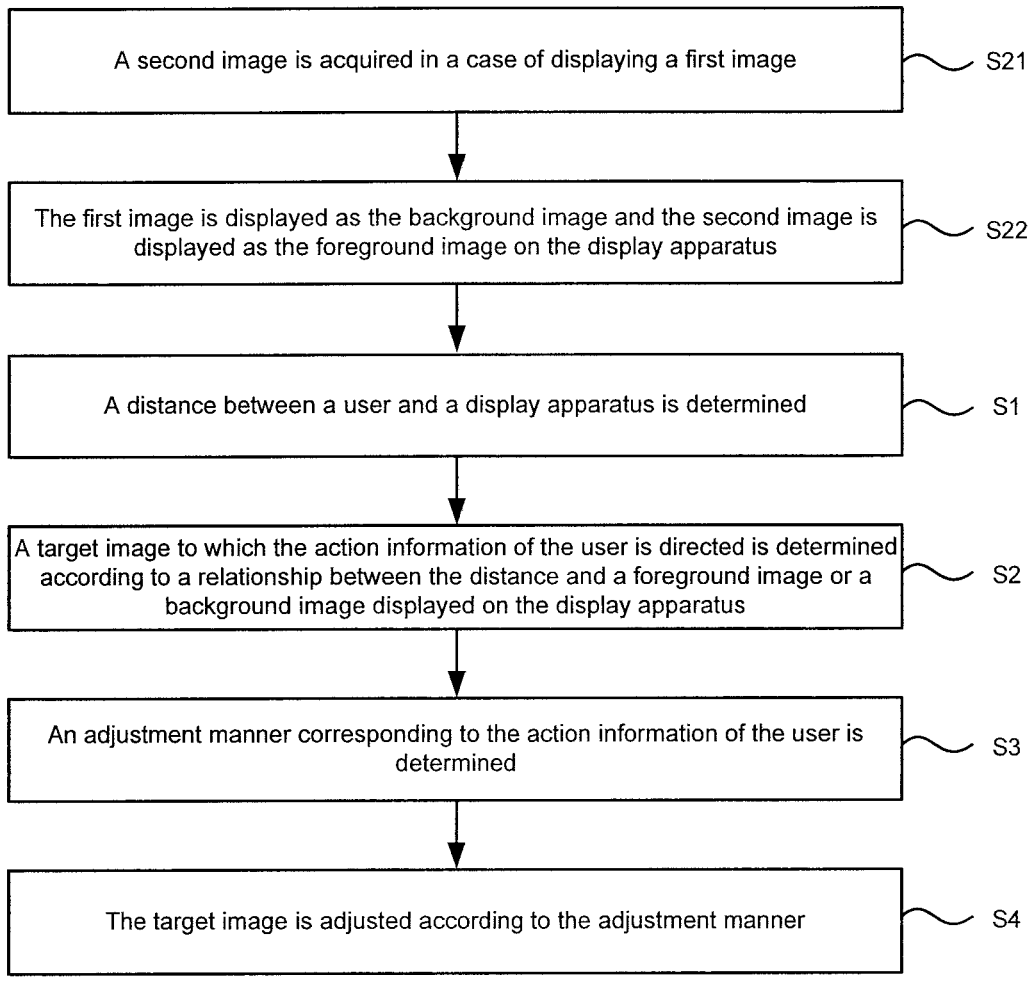
FIG. 2 is a schematic flowchart of another image adjustment method according to an embodiment of the present disclosure.

FIG. 2 is a schematic flowchart of another image adjustment method according to an embodiment of the present disclosure. As shown in FIG. 2, on the basis of the embodiment shown in FIG. 1, the method further comprises the following steps.

In step S21, a second image is acquired in a case of displaying a first image, before the distance between the user and the display apparatus is determined.

In step S22, the first image is displayed as the background image and the second image is displayed as the foreground image on the display apparatus.

In an embodiment, the foreground image and the background image may be from two images, wherein when the second image is further acquired in the case of displaying the first image, the second image may be displayed on the first image. Thereby, the first image is displayed as the background image and the second image is displayed as the foreground image. In this case, the foreground image and the background image may be directly determined according to an order in which the images are displayed, without identifying content in the images, which is a relatively simple determination manner.

Figure 3:
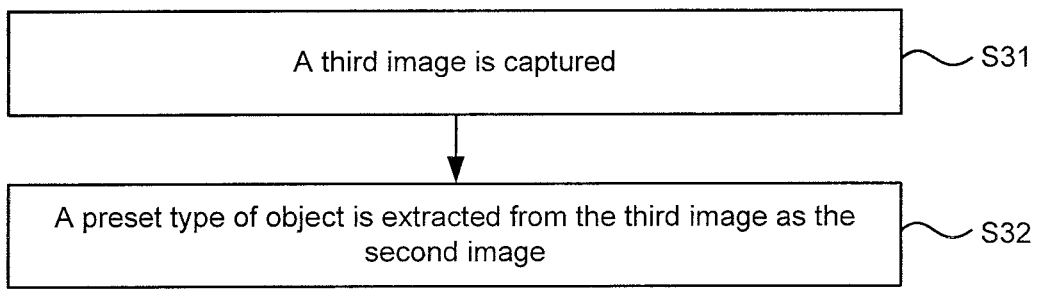
FIG. 3 is a schematic flowchart of acquiring a second image according to an embodiment of the present disclosure.

FIG. 3 is a schematic flowchart of acquiring a second image according to an embodiment of the present disclosure. As shown in FIG. 3, on the basis of the embodiment shown in FIG. 2, acquiring a second image comprises the following steps.

In step S31, a third image is captured.

In step S32, a preset type of object is extracted from the third image as the second image.

In an embodiment, a lot of content is contained in an image, and content which needs to be adjusted by the user is often only a part of the content in the image. Therefore, for the acquired third image, the preset type of object may be automatically extracted from the third image as the second image and may be automatically superimposed on the first image, without the user manually selecting the preset type of object in order to improve the operation efficiency of the user.

Here, the preset type of object may be set as needed, for example, the preset type of object may be a human body, a vehicle, a pet, etc. If the preset type of object is a human body, the human body may be extracted from the third image as the second image and may be superimposed on the first image.

It should be illustrated that an operation of extracting the preset type of object from the third image may be performed as needed. For example, the preset type of object may be extracted through an image segmentation process, which will not be described in detail here.

Figure 4:
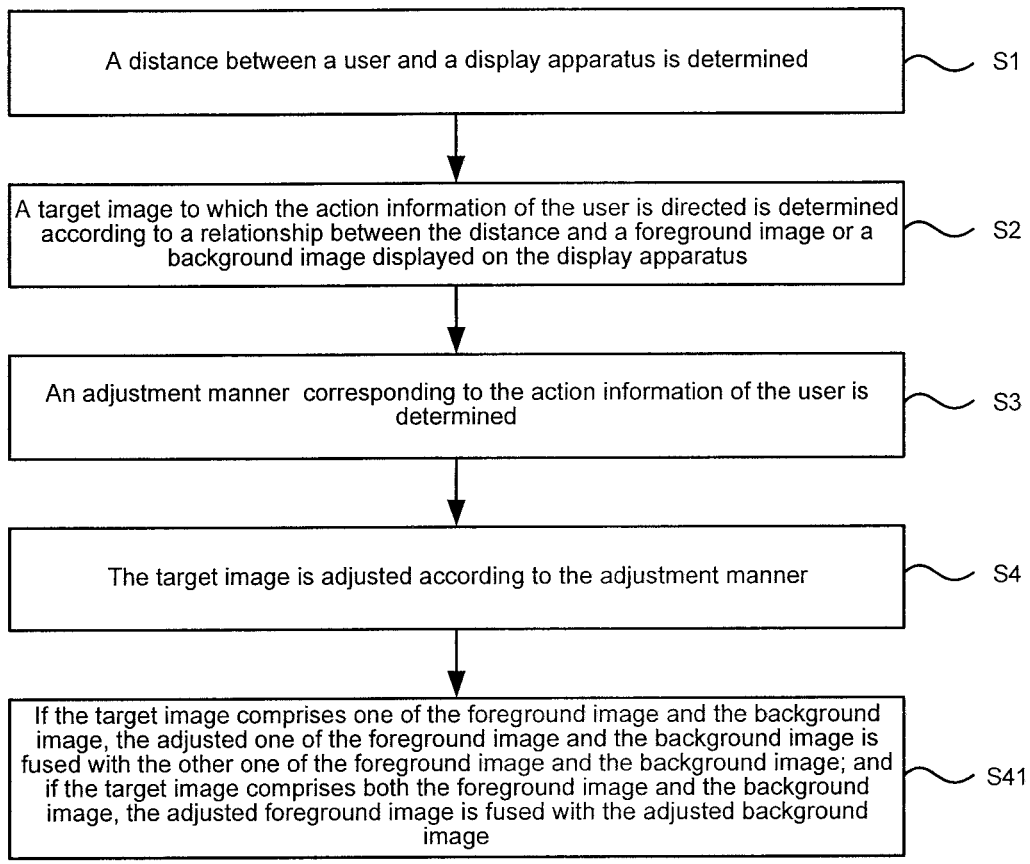
FIG. 4 is a schematic flowchart of still another image adjustment method according to an embodiment of the present disclosure.

FIG. 4 is a schematic flowchart of still another image adjustment method according to an embodiment of the present disclosure. As shown in FIG. 4, on the basis of the embodiment shown in FIG. 1, the method further comprises the following steps.

In step S41, if the target image comprises one of the foreground image and the background image, the adjusted one of the foreground image and the background image is fused with the other one of the foreground image and the background image; and if the target image comprises both the foreground image and the background image, the adjusted foreground image is fused with the adjusted background image.

In an embodiment, if steps S2 to S4 are performed only once, the foreground image or the background image is selected as the target image, in which case the adjusted target image may be fused with the image which has not been adjusted.

Steps S2 to S4 may be performed again after steps S2 to S4 are performed once, and when step S2 is performed again, the target image corresponding to the action information of the user is changed by changing the distance between the user and the display apparatus. Thereby, after steps S2 to S4 are performed many times, both the foreground image and the background image may be selected as the target images, in which case the adjusted foreground image may be fused with the adjusted background image.

Accordingly, the user may select images as target images to be adjusted through multiple operations, and finally perform the fusion operation. Here, an instruction to perform the fusion operation may also be generated based on action information of the user.

It should be illustrated that, the manner in which the images are fused may be selected as needed. For example, two or more images may be fused by means of boundary fusion, which will not be described in detail here.

Figure 5:
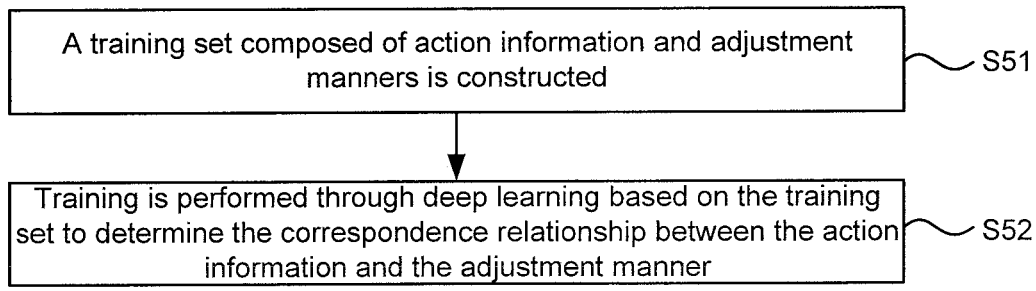
FIG. 5 is a schematic flowchart of determining a correspondence relationship between action information and an adjustment manner according to an embodiment of the present disclosure.

FIG. 5 is a schematic flowchart of determining a correspondence relationship between action information and an adjustment manner according to an embodiment of the present disclosure. As shown in FIG. 5, the correspondence relationship between the action information and the adjustment manner is predetermined by the following steps.

In step S51, a training set composed of action information and adjustment manners is constructed.

In step S52, training is performed through deep learning based on the training set to determine the correspondence relationship between the action information and the adjustment manner.

In an embodiment, a training set composed of action information and adjustment manners may be constructed, wherein the training set may comprise a plurality of features of the action information, for example, the action information is action information of a hand of a user, then the plurality of features may comprise a number of fingers, angles between the respective fingers, identifications of the fingers, etc., different features may constitute different action information, and different action information corresponds to different adjustment manners. Thereby, a model with the plurality of features as an input value and the corresponding action information as an output value may be constructed, and the model is trained through deep learning based on the training set to obtain a model which may accurately express the correspondence relationship between the action information and the adjustment manners. In this way, when action information is acquired, features of the action information may be input into the model to obtain an adjustment manner corresponding to the action information.

In correspondence with the embodiments of the image adjustment methods described above, the present disclosure further proposes embodiments of image adjustment apparatuses.

Figure 6:
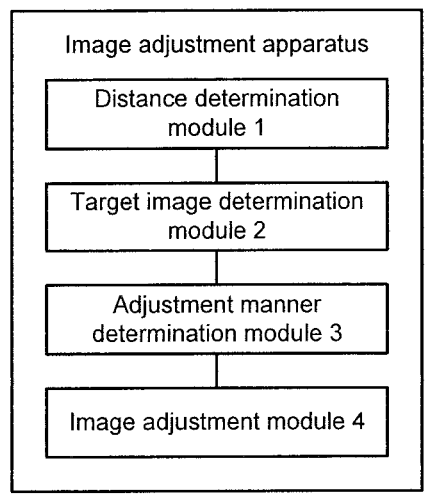
FIG. 6 is a schematic block diagram of an image adjustment apparatus according to an embodiment of the present disclosure.

FIG. 6 is a schematic block diagram of an image adjustment apparatus according to an embodiment of the present disclosure. The apparatus according to the present embodiment may be applied to a display apparatus. The display apparatus according to the present embodiment may be any product or component having a display function, such as an electronic paper, a mobile phone, a tablet computer, a television, a notebook computer, a digital photo frame, a navigator, etc.

As shown in FIG. 6, the image adjusting apparatus may comprise:

a distance determination module 1 configured to determine a distance between a user and the display apparatus;

a target image determination module 2 configured to determine, according to a relationship between the distance or a foreground image and a background image displayed on the display apparatus, a target image to which action information of the user is directed, wherein the target image comprises at least one of the foreground image and the background image;

an adjustment manner determination module 3 configured to determine an adjustment manner corresponding to the action information of the user; and an image adjustment module 4 configured to adjust the target image according to the adjustment manner.

Figure 7:
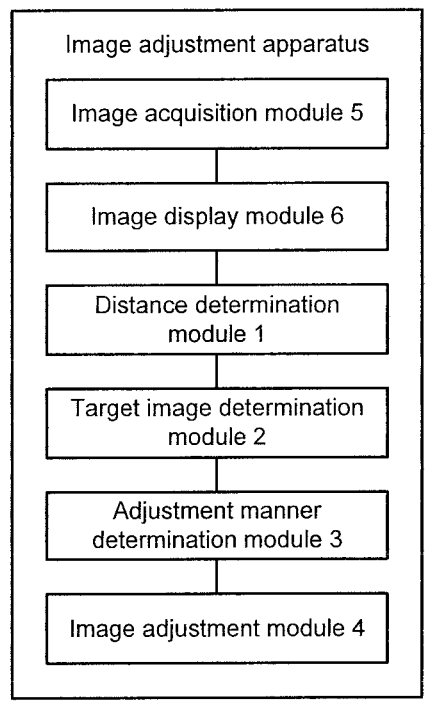
FIG. 7 is a schematic block diagram of another image adjustment apparatus according to an embodiment of the present disclosure.

FIG. 7 is a schematic block diagram of another image adjustment apparatus according to an embodiment of the present disclosure. As shown in FIG. 7, on the basis of the embodiment shown in FIG. 6, the apparatus further comprises:

an image acquisition module 5 configured to acquire a second image in a case of displaying a first image; and an image display module 6 configured to display the first image as the background image and display the second image as the foreground image on the display apparatus.

Figure 8:
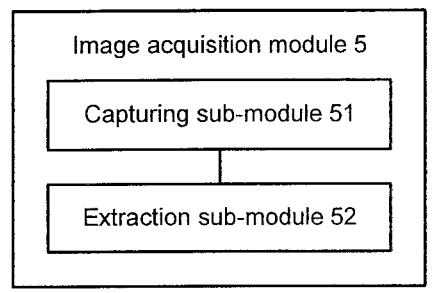
FIG. 8 is a schematic block diagram of an image acquisition module according to an embodiment of the present disclosure.

FIG. 8 is a schematic block diagram of an image acquisition module according to an embodiment of the present disclosure. As shown in FIG. 8, the image acquisition module 5 comprises:

a capturing sub-module 51 configured to capture a third image; and an extraction sub-module 52 configured to extract a preset type of object from the third image as the second image.

Figure 9:
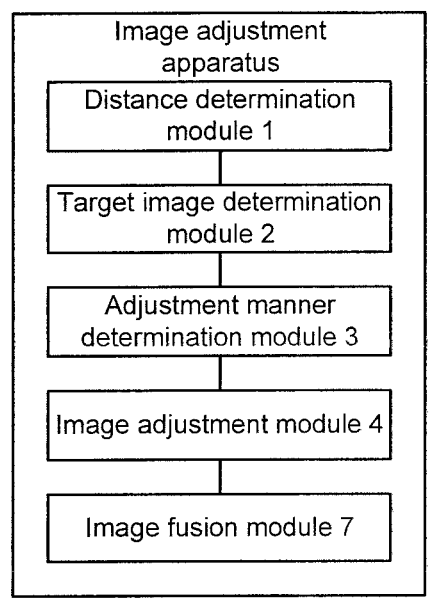
FIG. 9 is a schematic block diagram of still another image adjustment apparatus according to an embodiment of the present disclosure.

FIG. 9 is a schematic block diagram of still another image adjustment apparatus according to an embodiment of the present disclosure. As shown in FIG. 9, on the basis of the embodiment shown in FIG. 6, the apparatus further comprises:

an image fusion module 7 configured to, if the target image comprises one of the foreground image and the background image, fuse the adjusted one of the foreground image and the background image with the other one of the foreground image and the background image; and if the target image comprises both the foreground image and the background image, fuse the adjusted foreground image with the adjusted background image.

Figure 10:
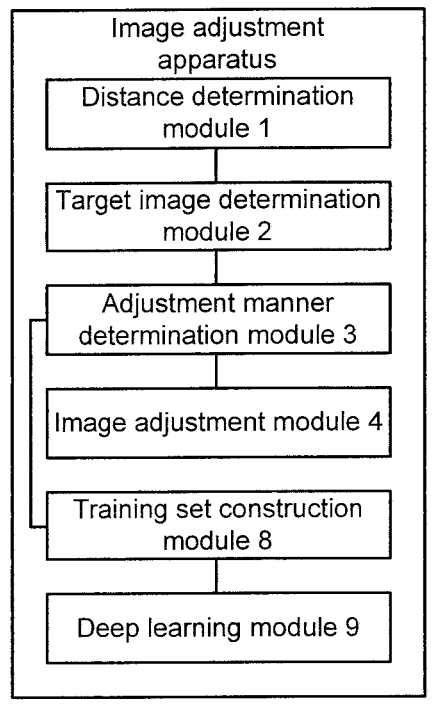
FIG. 10 is a schematic block diagram of yet another image adjustment apparatus according to an embodiment of the present disclosure.

FIG. 10 is a schematic block diagram of yet another image adjustment apparatus according to an embodiment of the present disclosure. As shown in FIG. 10, on the basis of the embodiment shown in FIG. 6, the apparatus further comprises:

a training set construction module 8 configured to construct a training set composed of action information and adjustment manners; and a deep learning module 9 configured to perform training through deep learning based on the training set to determine a correspondence relationship between the action information and the adjustment manner.

Figure 11:
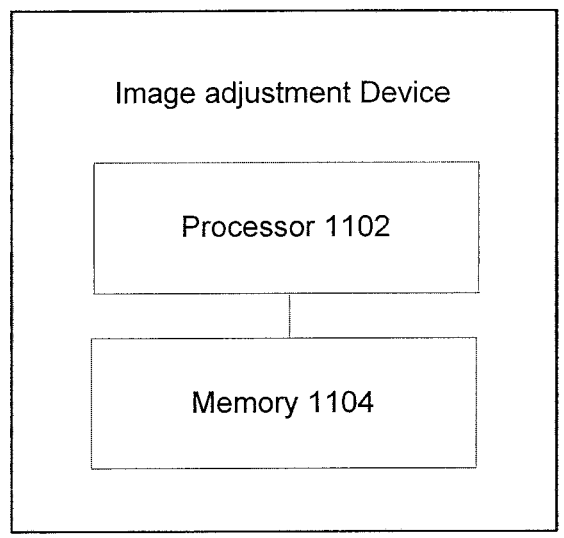
FIG. 11 is a schematic block diagram of an image adjustment device according to an embodiment of the present disclosure.

The embodiments of the present disclosure further provide an image adjustment device, of which a structural block diagram is shown in FIG. 11. The image adjustment device comprises a processor 1102 and a memory 1104. It should be illustrated that a structure in the structural diagram of the image adjustment device shown in FIG. 11 is merely exemplary and not restrictive, and the image adjustment device may further comprise other components depending on practical application requirements.

In an embodiment of the present disclosure, the processor 1102 and the memory 1104 may communicate with each other directly or indirectly. The processor 1102 may communicate with components such as the memory 1104 via a connection through a network. The network may comprise a wireless network, a wired network, and/or any combination thereof. The network may comprise a local area network, the Internet, a telecommunications network, an Internet of Things based on the Internet and/or telecommunications network, and/or any combination thereof etc. The wired network may be used for communication by means of twisted pair, a coaxial cable or optical fiber transmission etc., and the wireless network may use a communication manner such as a 3G/4G/5G mobile communication network, Bluetooth, Zigbee or WiFi etc. A type and a function of the network may not be limited here in the present disclosure.

The processor 1102 may control other components in the image adjustment device to perform desired functions. The processor 1102 may be a device having a data processing capability and/or a program execution capability, such as a Central Processing Unit (CPU), or a Graphics Processing Unit (GPU), etc. The CPU may be an X86 or ARM architecture etc. The GPU may be directly integrated into a motherboard or built into a Northbridge of the motherboard. The GPU may also be built into the CPU.

The memory 1104 may comprise any combination of one or more computer program products, which may comprise various forms of computer readable storage media, such as a volatile memory and/or a nonvolatile memory. The volatile memory may comprise, for example, a Random Access Memory (RAM) and/or a cache etc. The non-volatile memory may comprise, for example, a Read Only Memory (ROM), a hard disk, an Erasable Programmable Read Only Memory (EPROM), a portable Compact Disk Read Only Memory (CD-ROM), a Universal Serial Bus (USB) memory, a flash memory, etc.

One or more computer readable codes or instructions may be stored in the memory 1104, and the processor 1102 may execute the computer instructions to implement the image adjustment methods described above. A detailed description of a processing procedure of the image adjustment methods may be known with reference to the related description of the image adjustment methods according to the embodiments of the present disclosure, and will not be described in detail. Various applications and various data, such as image data sets and various data used and/or generated by the applications, etc., may also be stored in the computer readable storage medium.

The embodiments of the present disclosure further provide a computer readable storage medium having stored thereon a computer program which, when executed by a processor, implements the steps in the image adjustment method according to any of the embodiments described above.

With regard to the apparatuses in the embodiments described above, a specific manner in which the respective modules perform operations has been described in detail in the embodiments of the related methods, and will not be described in detail here.

For the apparatus embodiments, since they substantially correspond to the method embodiments, related parts of the apparatus embodiments may be known with reference to a part of the description of the method embodiments. The apparatus embodiments described above are merely illustrative, wherein the modules described as separate components may or may not be physically separate, and the components displayed as modules may or may not be physical modules, that is, they may be located at one place, or may also be distributed on multiple network modules. Some or all of the modules may be selected according to practical requirements to achieve the purposes of the present disclosure, and may be understood and implemented by those of ordinary skill in the art without any creative work.

In the present disclosure, terms "first" and "second" are used for descriptive purposes only and are not to be construed as indicating or implying relative importance. The term "plurality" refers to two or more, unless specifically defined otherwise.

Other implementations of the present disclosure will be readily apparent to those skilled in the art after considering the specification and taking practice of the present disclosure here. The present disclosure is intended to cover any variations, uses, or adaptations of the present disclosure, which are according to the general principles of the present disclosure and comprise common general knowledge or conventional technical means in the art which are not disclosed in the present disclosure. The specification and the embodiments are to be regarded as illustrative only, and the true scope and spirit of the present disclosure are pointed out by the appended claims.

It is to be understood that the present disclosure is not limited to accurate structures which have been described above and illustrated in the accompanying drawings, and various modifications and changes may be made to the present disclosure without departing from the scope of the present disclosure. The scope of the present disclosure is merely limited by the appended claims.

We claim:
1. An image adjustment method, comprising:
determining a distance between a user and a display apparatus;
determining, according to a relationship between the distance and a foreground image or a background image displayed on the display apparatus, a target image to which action information of the user is directed, wherein the target image comprises at least one of the foreground image and the background image;
determining an adjustment manner corresponding to the action information of the user; and
adjusting the target image according to the adjustment manner,
wherein the determining of the target image comprises:
when the distance is within a first distance range, determining the foreground image as the target image; and when the distance is within a second distance range different from the first distance range, determining the background image as the target image.
2. The method according to claim 1, further comprising:
acquiring a second image in a case of displaying a first image, before determining the distance between the user and the display apparatus; and
displaying, on the display apparatus, the first image as the background image and the second image as the foreground image.
3. The method according to claim 2, wherein acquiring a second image comprises:
capturing a third image; and
extracting a preset type of object from the third image as the second image.
4. The method according to claim 1, further comprising:
if the target image comprises one of the foreground image and the background image, fusing the adjusted one of the foreground image and the background image with the other one of the foreground image and the background image; and
if the target image comprises both the foreground image and the background image, fusing the adjusted foreground image with the adjusted background image.
5. The method according to claim 1, wherein a correspondence relationship between the action information and the adjustment manner is predetermined by:
constructing a training set composed of action information and adjustment manners; and
performing training through deep learning based on the training set to determine the correspondence relationship between the action information and the adjustment manner.
6. An image adjustment device, comprising:
a processor; and
a memory coupled to the processor and having instructions stored thereon and executable by the processor;
wherein the instructions, when executed by the processor, cause the processor to be configured to:
determine a distance between a user and a display apparatus;
determine, according to a relationship between the distance and a foreground image or a background image displayed on the display apparatus, a target image to which action information of the user is directed, wherein the target image comprises at least one of the foreground image and the background image;
determine an adjustment manner corresponding to the action information of the user; and
adjust the target image according to the adjustment manner, and
wherein the processor is further configured to: determine the foreground image as the target image, when the distance ii within a first distance range; and determine the background image as the target image, when the distance is within a second distance range different from the first distance range.

7. The device according to claim 6, wherein the processor is further configured to:
acquire a second image in a case of displaying a first image; and
display, on the display apparatus, the first image as the background image and the second image as the foreground image.

8. The device according to claim 7, wherein the processor is further configured to:
capture a third image; and
extract a preset type of object from the third image as the second image.

9. The device according to claim 6, wherein the processor is further configured to:
if the target image comprises one of the foreground image and the background image, fuse the adjusted one of the foreground image and the background image with the other one of the foreground image and the background image; and if the target image comprises both the foreground image and the background image, fuse the adjusted foreground image with the adjusted background image.

10. The device according to claim 6, wherein the processor is further configured to:
construct a training set composed of action information and adjustment manners; and
perform training through deep learning based on the training set to determine the correspondence relationship between the action information and the adjustment manner.

11. A non-transitory computer readable storage medium having stored thereon a computer program which, when executed by a processor, implements the steps of the method according to claim 1.

* * * * *